United States Patent [19]

Fisher et al.

[11] Patent Number: 4,526,378

[45] Date of Patent: Jul. 2, 1985

[54] FILTER TUBE GASKET

[75] Inventors: Don J. Fisher, Colleyville; Donald F. North, Carrollton, both of Tex.

[73] Assignee: Peerless Manufacturing Company, Dallas, Tex.

[21] Appl. No.: 619,355

[22] Filed: Jun. 11, 1984

[51] Int. Cl.³ .................. F16J 15/10; B01D 46/00
[52] U.S. Cl. .................... 277/12; 277/82; 277/84; 277/177; 277/193; 277/199; 277/212 R; 55/502; 55/507; 210/462; 285/9 R; 285/337
[58] Field of Search .............. 138/89; 55/502, 507; 210/462; 277/82, 84, 192-194, 199, 186, 187, 177, 165, 212 R, 212 C, 212 F, 212 FB; 141/369-372, 386, 149, 278; 285/9 R, 337; 134/166 R

[56] References Cited

U.S. PATENT DOCUMENTS

| | | | |
|---|---|---|---|
| 1,726,479 | 8/1929 | Engle | 141/386 X |
| 2,329,028 | 9/1943 | Austin . | |
| 2,456,262 | 12/1948 | Fields . | |
| 2,755,106 | 7/1956 | Brennan et al. | 285/337 X |
| 2,867,462 | 1/1959 | Nielsen . | |
| 2,985,291 | 5/1961 | Schoepe et al. | 277/212 X |
| 3,134,601 | 5/1964 | Hager | 277/193 X |
| 3,155,396 | 11/1964 | Smith | 277/212 |
| 3,408,095 | 10/1968 | Moore . | |
| 3,448,746 | 6/1969 | Butler | 134/166 R X |
| 3,622,167 | 11/1971 | Velthoven | 277/166 |
| 3,705,824 | 12/1972 | Erickson | 136/181 |
| 4,407,664 | 10/1983 | Sillers | 55/509 X |

FOREIGN PATENT DOCUMENTS

| | | | |
|---|---|---|---|
| 193467 | 12/1907 | Fed. Rep. of Germany | 134/166 R |
| 580957 | 9/1946 | United Kingdom | 277/82 |

Primary Examiner—Robert S. Ward
Attorney, Agent, or Firm—Richards, Harris, Medlock & Andrews

[57] ABSTRACT

A gasket (16) for sealing between a filter (10) and a support tube (12) adjacent a seat ring (14). A first sealing surface (18) is provided on the gasket (16) for sealing axially against the seat ring (14). A second sealing surface (20) on the same gasket (16) for lateral sealing against the support tube (12) to maintain a sealed condition when axial sealing cannot be sustained.

3 Claims, 2 Drawing Figures

FILTER TUBE GASKET

TECHNICAL FIELD

This invention relates to sealing gaskets and, more particularly, to gaskets for sealing one end of filter tube assemblies within a pressure vessel assembly.

BACKGROUND ART

Many applications exist where an interface separates two fluids having different properties. It is often necessary to provide a seal at the interface to prevent mixing of the fluids or the transfer of one fluid into a volume occupied by a second fluid. Typically, seals may take the form of compression seals at abutting surfaces, wipers at sliding surfaces and gland-type seals for concentric surfaces.

Compression seals between abutting surfaces are frequently used where the abutting surfaces must be assembled and disassembled. However, the abutting surfaces compressing the seal generally have manufacturing tolerances which effect the parallelism between the surfaces. Further, the structures forming the abutting surfaces may not always be axially aligned so that, again, the surfaces are not parallel. Frequently, both of these conditions exist, requiring that the compression seal accommodate a range of displacements between the abutting surfaces.

Typically, a pressure differential exists across the interface and the seal must exert sufficient sealing force to overcome the forcing effect of the differential pressure. The sealing force is a function of the elasticity of the sealing material, the seal dimensions and the actual displacement to be occupied by the seal. No sealing exists where the displacement is greater than the seal dimensions can occupy. On the other hand, seal removal and installation will be increasingly difficult as seal compression requirements increase.

Thus, it would be desirable for a seal or gasket to retain sealing capability over a wide range of adjoining surface displacements while permitting the surfaces to be assembled or disassembled with a minimum effort. These, and other problems in the prior art, are overcome by the present invention wherein an improved gasket provides a compression seal including both a wiper seal configuration and an axial compression seal configuration.

SUMMARY OF THE INVENTION

A gasket is provided for sealing between an inlet tube and a nested support tube having a seat ring. The gasket has a first surface for axially sealing against the seat ring. A lip member is provided parallel with the first surface for laterally sealing against the support tube. The two sealing actions are, thus, independent from one another while provided by a single gasket member.

In one embodiment, an "O" ring portion defining a circumferential axial slot is provided for fixing to the end portion of the inlet tube. An "L" seal ring portion is then provided for fixing within the axial slot to form both the first sealing surface and the lip member.

A filter tube assembly is provided for mating and sealing with a nested support tube having a depending sealing ring surface formed thereabout. A conventional filter tube having a front and a rear end is provided. A cap may be provided for the front end which seals with the front end and serves to support the front end within a flow vessel. An urging means, such as a spring, may then be provided for bearing against the cap and biasing the rear end of the filter tube toward the support tube sealing ring surface. The rear end of the filter tube includes a gasket having a first portion molded directly to the filter tube rear end and a second portion which has a first sealing surface in facing relationship with the sealing ring surface. The second portion terminates in an extending lip which can sealingly engage the nested support tube.

It is an object of the present invention to maintain a seal in the area adjoining the filter tube and the support tube.

It is another feature of the present invention to enable the filter tube assembly to be removed and replaced on the nested support tube without the need for substantial force to obtain a sealing relationship.

One other feature is to enable the gasket assembly to be conventionally molded with the filter tube assembly.

These and other features and advantages of the present invention will become apparent from the following detailed description, wherein reference is made to the figures in the accompanying drawing.

DETAILED DESCRIPTION

Figure 1:
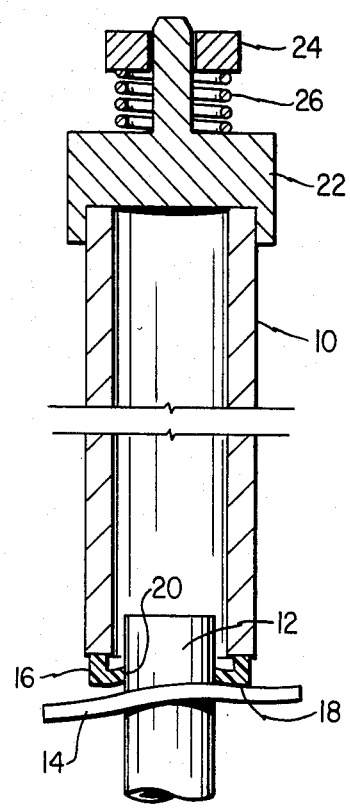
FIG. 1 is a simplified cross sectional view of a filter tube assembly installed on a support tube in accordance with one embodiment of the present invention.

Referring now to FIG. 1, there may be seen in partial cross section a filter tube assembly having a sealing gasket in accordance with one embodiment of the present invention. While many applications exist for the gasket herein described, the filter tube assembly depicted in FIG. 1 is a preferred application. The gasket design is particularly suitable for the pressure differentials which exist across a filter element tending to promote fluid interchange at nonsealed interfaces and for ease of assembly at areas which are difficult to access.

The filter tube assembly of FIG. 1 includes filter tube element 10, conventionally formed to separate portions of a fluid external to filter tube 10 from fluid passing to the interior of filter tube 10. The removed material may be solids in a gas or in a liquid, liquid in a gas or the like. Filter tube 10 may have an open front end and an open rear end.

The front end may be sealingly closed by a cap 22. A preferred cap with support assembly is described in U.S. Pat. No. 4,407,664 to Sillers, which disclosure is incorporated herein by reference. Cap 22 may engage in and be supported by support bracket 24 with urging means 26 therebetween for engaging cap 22, similar to the structure depicted in the Sillers' patent.

The rear end of filter tube 10 generally engages an assembly for exiting the material entering the interior of filter tube 10. As shown in FIG. 1, pipe 12 provides support for the filter tube and functions as an outlet pipe for the interior fluid. A sealing surface is generally provided adjacent pipe 12. The sealing surface may be seat ring 14, depicted herein and circumferentially depending from pipe 12, or may be a portion of a bulkhead assembly supporting a plurality of pipes 12. In any event, the sealing surface is generally perpendicular to the axis of pipe 12 and filter tube 10.

As may be seen from FIG. 1, a variety of conditions may exist which affect the ability of any gasket to seal the rear end of filter tube 10 with seat ring 14, or an equivalent bulkhead, and adjacent pipe 12. Seat ring 14, or a corresponding bulkhead, is subject to manufacturing tolerances and to distortions resulting from various thermal and stress gradients. Likewise, the axial alignment between pipe 12 and the support of cap 22 may vary as a result of manufacturing tolerances, installation technique and operating shifts. These conditions, either singly or in combination, tend to provide a variety of interface conditions at the rear end of filter tube 10 which a gasket must accommodate.

Again referring to FIG. 1, a gasket according to the present invention is provided which accommodates the various sealing gap configurations which can arise as a result of manufacturing and operational mismatch conditions. Gasket 16 is placed at the rear end of filter tube 10 and may be fixed thereto to preclude ingestion by the system at various operating pressures. Gasket 16 provides a first sealing surface 18 responsive to axial movement of filter tube 10, compressing a portion of gasket 16 against axial sealing surface 18.

A backup seal, however, is now provided by an extending lip portion 20 forming a lateral sealing surface for engaging the outer diameter of pipe 12. Thus, a first seal is provided responsive to axial conditions and a second seal is provided responsive to lateral conditions. In a preferred embodiment, each seal surface is effective to permit only a maximum effective leakage flow at expected operating and manufacturing mismatch conditions.

Figure 2:
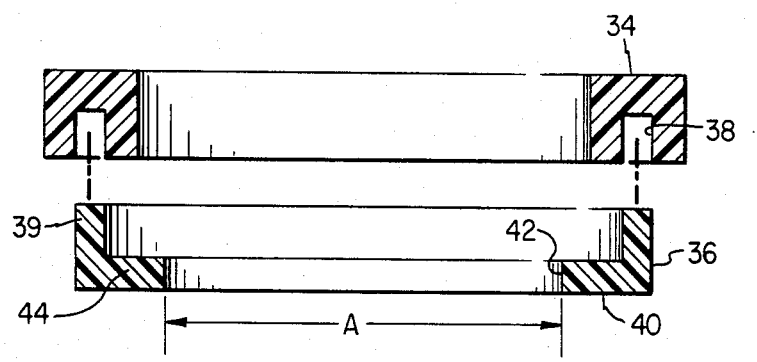
FIG. 2 is a cross-sectional representation of a gasket according to one embodiment of the present invention.

As shown in FIG. 1, a single gasket 16 may be provided having two arms in substantially perpendicular relationship. For manufacturing purposes, it may be desirable to form gasket 16 from two distinct pieces, as depicted in FIG. 2. Thus, an "O" ring portion 34 may be provided for fixing to filter tube 10 (FIG. 1). "O" ring 34 may be glued or molded to filter tube 10. A conventional "O" ring is typically used to form the seal herein discussed, responsive only to axial compression to maintain the seal. However, the "O" ring may be bonded to filter tube 10 using conventional manufacturing techniques and a standard autoclave since "O" ring 34 is concentric with filter tube 10.

Thus, where "O" ring 34 is provided for assembly with conventional techniques, circumferential axial slot 38 is formed. Slot 38 functions in cooperation with a "L"-shaped lateral seal ring 36 to form the gasket assembly. A first arm 39 is provided for engaging receiving slot 38. First arm 39 may be suitably fixed within slot 38 by friction and compression forces in some applications or an adhesive or other means may be required to suitably join first arm 39 within slot 38.

Second arm 44 is now provided to obtain the sealing functions. Axial sealing surface 40 is provided for compression engagement with seat ring 14 (FIG. 1), or an equivalent bulkhead. Second arm 44 terminates in lateral sealing surface 42 for sealing against pipe 12 (FIG. 1).

Generally, "O" ring portion 34 and "L" seal ring 36 portion may be formed of the same resilient material. However, it will be appreciated that "O" ring portion 34 may be selected for bonding with filter element 10 and "L" seal ring 36 may be selected for sealing properties. The performance characteristics of a gasket as depicted in FIG. 2 and having an inner diameter "A" for the lateral sealing surface 42 is shown in Table A, below. The filter tube assembly was installed on a support pipe 12 (FIG. 1) having a nominal outside diameter of 4 3/16". Typical dimensions of the gasket components depicted in FIG. 2 are the following:

| DESCRIPTION | FRACTIONS |
|---|---|
| "O" ring inner diameter | 4⅛" |
| "O" ring 34 outer diameter | 5⅛" |
| second arm 44 thickness | 1/16" |

The Durometer reading is a measure of the resilience of the material according to ASTM Standard No. D2240-75. The higher the Durometer value the harder or stiffer the material. Table A is based solely on the performance of lateral sealing surface 42 at a variety of differential pressure conditions. The leakage flow through the seal is indicated and the maximum differential pressure which the seal withstood without opening is illustrated. The chart further indicates the relative difficulty of installing the seal over a standpipe.

TABLE A

| DIA. A. (in.) | Durometer | Installation Difficulty | Leakage (SCFH) 0.5 psi | Leakage (SCFH) 0.25 psi | Seal Break @ 0.5/0.25 | Seal Break @ 7.4 psi [max. W p psi] |
|---|---|---|---|---|---|---|
| 4 1/16 | U-40 | No | 15.5 | 20 | No | [2.5] |
| 4 1/16 | U-60 | No | 13 | 17 | No | [4.4] |
| 4 1/16 | U-80 | No | 16 | 20 | No | No |
| 4 | U-40 | No | 23 | 33 | No | [2.5] |
| 4 | U-60 | No | 26.5 | 36 | No | [4.9] |
| 4 | U-80 | Some | 20 | 31 | No | No |
| 3 15/16 | U-40 | No | 10 | 12 | No | [6.4] |
| 3 15/16 | U-60 | Some | 8 | 9 | Yes @ 0.5 | [4.9] |
| 3 15/16 | U-80 | Some | 10.5 | 13 | No | [4.7] |

As shown in Table A, a variety of acceptable conditions exist with particular reference to the performance parameters of installation difficulty and the seal integrity up to 0.5 psi differential pressure. A preferred configuration for use with a pipe having a nominal 4 3/16" outer diameter includes a lateral seal inner diameter of 4 1/16" with a material having a Durometer reading of 80. This configuration produced an acceptably low leakage rate and ease of installation.

Typically, elastomeric materials are used to form the gaskets depicted in FIGS. 1 and 2. A preferred material is a nitrile rubber and, more particularly, Buna-N, an acrylonitrile-butadienne copolymer. Suitable alternate materials include fluorinated elastomers, such as sold under the trademark VITON, and silicon elastomers.

It is therefore apparent that the present invention is one well adapted to attain all of the objects and advantages hereinabove set forth together with other advantages which will become obvious and inherent from a description of the apparatus itself. It will be understood that certain combinations and subcombinations are of utility and may be obtained without reference to other features and subcombinations. This is contemplated by and is within the scope of the present invention.

As many possible embodiments may be made of this invention without departing from the spirit or scope thereof, it is to be understood that all matters herein set forth in the accompanying drawings are to be interpreted as illustrative and not in any limiting sense.

What is claimed is:

1. A filter tube assembly for sealingly mating with a nested support tube having a depending sealing ring surface, comprising:
   a filter tube having a front end and a rear end;
   a cap for sealingly supporting said front end,
   urging means bearing against said cap for biasing said rear end toward said sealing ring surface,
   a gasket having a first portion molded to said filter tube rear end and a second portion having a first sealing surface in facing relationship with said sealing ring surface and terminating in an extending lip for sealingly engaging said nested support tube.

2. A filter tube assembly according to claim 1, wherein
   said first portion is an "O" ring defining an axial circumferential slot opening toward said sealing ring surface, and
   said second portion is an "L" ring having a first arm fixedly engaging said slot and a second arm depending from said first arm and forming said first sealing surface with said extending lip.

3. A filter tube assembly according to claim 1, wherein said extending lip has an inside diameter effective for said gasket to seal said filter tube rear end during movement of said cap within said urging means and over a range effective to accommodate fabrication tolerances.

* * * * *